July 26, 1955  A. F. BENSON  2,713,792
GAS METER CASING

Filed Nov. 25, 1953  2 Sheets-Sheet 1

INVENTOR
Arthur F. Benson
BY Ralph Hammar
ATTORNEY

July 26, 1955  A. F. BENSON  2,713,792
GAS METER CASING
Filed Nov. 25, 1953  2 Sheets-Sheet 2
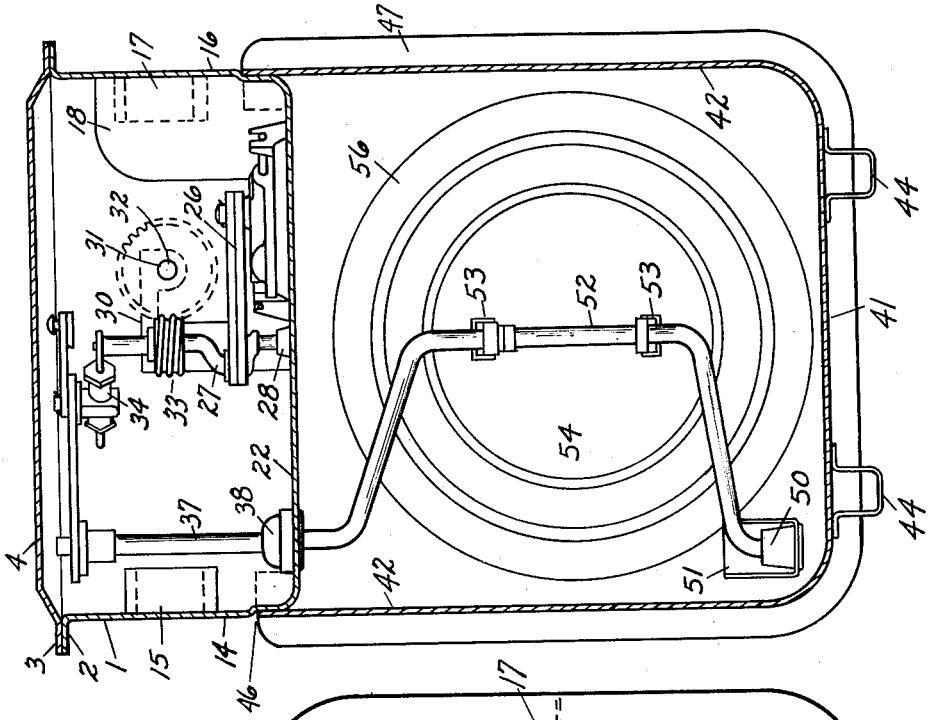
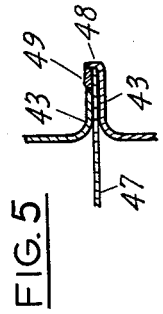
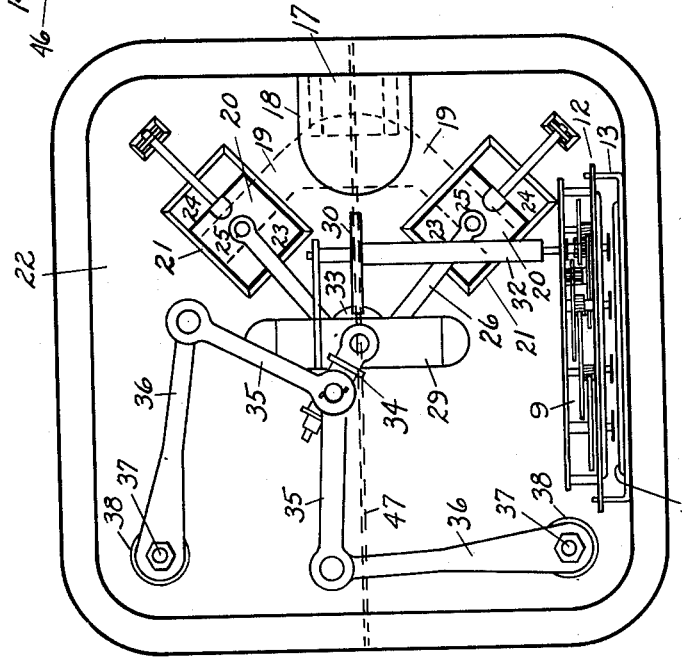
INVENTOR
Arthur F Benson
BY Ralph Hammar
ATTORNEY

United States Patent Office 2,713,792
Patented July 26, 1955

2,713,792

GAS METER CASING

Arthur F. Benson, Erie, Pa., assignor to American Meter Company, Incorporated, Erie, Pa., a corporation of Delaware Application November 25, 1953, Serial No. 394,335

2 Claims. (Cl. 73—274)

This invention is intended to simplify gas meter construction by having a case consisting of an open-topped gas distributing chamber and its cover and a split lower case into which the lower end of the chamber is telescoped. The halves of the lower case have outwardly extending flanges which are soldered or welded to a center partition depending from the gas distributing chamber. All the operating parts are mounted on the gas distributing chamber and on the center partition and the assembly of the meter is completed by fastening the cover to the open top of the gas distributing chamber and by fastening the flanges on the split lower casing to the center partition.

Figure 1:
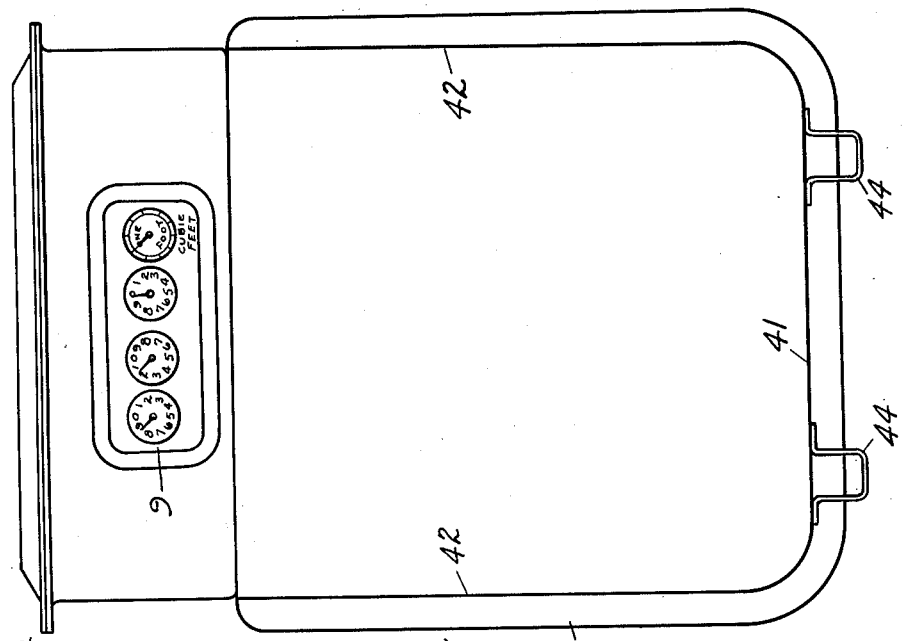
Figure 2:
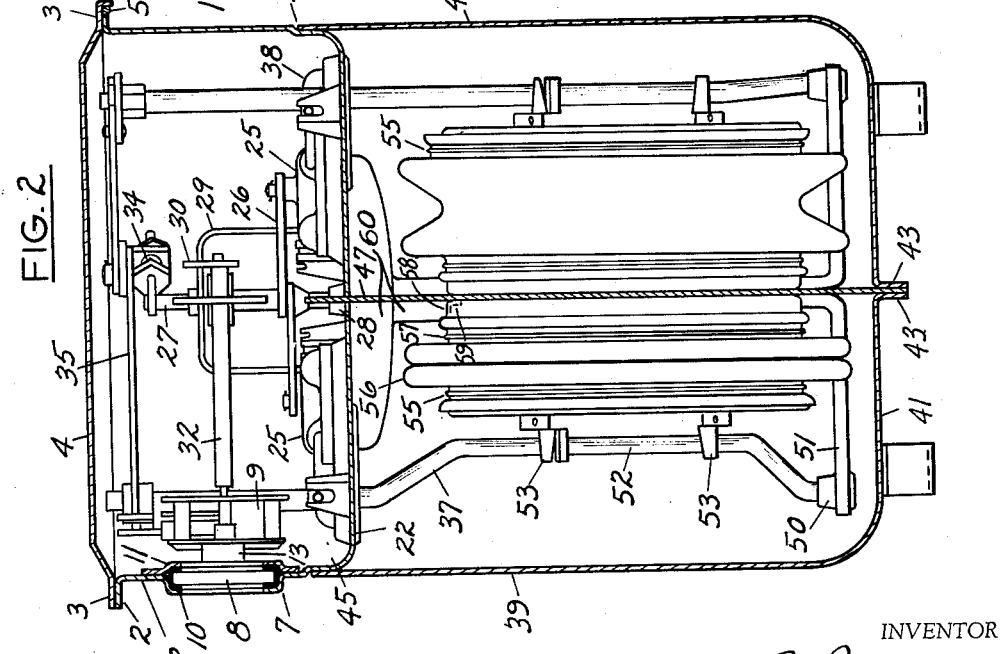

In the accompanying drawings, Fig. 1 is a front view of the gas meter; Fig. 2 is a sectional side elevation; Fig. 3 is a top plan view with the cover removed; Fig. 4 is a sectional front elevation; and Fig. 5 is a detail of a soldered seam which may be used in place of seam welding.

The gas distributing chamber is made from a drawn sheet metal pan 1 having an outwardly extending peripheral flange 2 at the open top to which is fixed a complementary flange 3 at the periphery of a cover 4. When the cover is to be attached to the gas distributing chamber by seam welding, the flanges 2 and 3 are flat. When the cover is to be attached by soldering, the flange 3 has a down-turned rim 3a which surrounds the flange 2 and provides a space for a bead 5 of solder as shown at the right in Fig. 2. The pan 1 has a front wall 6 provided with a flanged recess 7 for a window 8 through which the meter register 9 can be observed. A gasket 10 surrounds the periphery of the window 8 and a window frame 11 is soldered or welded to the inner face of the front wall 6 thereby clamping the window in place and making a gastight connection. The meter register 9 is a self-contained unit having a frame 12 which is soldered to tabs 13 on the window frame 11. In one of the side walls 14 of the gas distributing chamber is fixed an inlet fitting 15 for connection to an incoming gas line. In the opposite side wall 16 of the gas distributing chamber is fixed an outlet fitting 17 for connection to an outgoing gas line. The outlet fitting 17 has its inner end communicating with an outlet channel 18 having branched connections 19 leading to outlet ports 20 on valve chambers 21 fixed to the bottom wall 22 of the gas distributing chamber. The valve chambers 21 are spaced on opposite sides of the center of the gas distributing chamber. On opposite sides of the valve outlet ports 20 are ports 23 and 24 respectively conducting gas into and out of measuring chambers beneath the bottom wall 22 of the gas distributing chamber. On the valve chambers are slides 25 which alternately connect one of the ports 23 and 24 to the outlet port 20 and at the same time expose the other of the ports 24, 23 to the gas distributing chamber. The slides 25 are connected by links 26 on a crankshaft 27 having its lower end journaled in a bearing 28 fixed to the bottom wall 22 of the gas distributing chamber and having its upper end carried in a bracket 29 likewise fixed to the bottom wall 22 of the gas distributing chamber. The bracket 29 also carries a support 30 for a bearing 31 for the shaft 32 driving the index 9 through a worm and gear drive 33.

At the upper end of the crankshaft 27 is a tangent 34 connected by links 35 to crank arms 36 fixed to the upper ends of flag rods 37 journaled in combined bearings and seals 38 in the bottom wall 22 of the gas distributing chamber. As is customary in gas meters during the operation, the flag rods 37 oscillate thereby driving the crankshaft 27 through the tangent 34 and causing rotation of the shaft 32 to drive the meter register 9 and also causing reciprocation of the slides 25 to control the flow of gas into and out of the gas measuring chambers presently to be described.

The measuring chambers are contained within a lower case made in two halves, a front half 39 and a back half 40 of identical shape, each having bottom walls 41 and side walls 42 terminating in an outwardly extending peripheral flange 43. On each of the bottom walls 41 is fixed a pair of feet 44. When the two lower case sections 39 and 40 are placed face-to-face with the flanges 43 opposite each other, a complete lower case is formed into which the lower end 45 of the gas distributing chamber is telescoped and sealed, for example, by soldering at 46. When the lower case sections 39 and 40 are asssembled, the flanges 43 abut opposite sides of a center partition 47 depending from and sealed to the bottom wall 22 of the gas distributing chamber. The flanges 43 may be secured to the center partition 47 by seam welding or, as indicated in Fig. 5, one of the flanges 43 may be provided with a rim 48 receiving a bead 49 of solder. The assembly of the lower case sections 39, 40 imparts rigidity to the previously assembled parts and puts the meter in condition for calibrating adjustment. The final step in the manufacture of the meter is the assembly of the cover 4 by welding or soldering after the calibrating adjustments have been made.

On opposite sides of the center partition 47 are identical pairs of gas measuring chambers, each connected to the flag rod 37 on its side of the partition. The lower end of each flag rod 37 is carried in a bearing 50 in a support 51 fixed to the center partition 47. At an intermediate part of the flag rod is a crank pin 52 pivotally connected to brackets 53 on a disk 54 having an axially extending cylindrical flange 55 to which is tied one end of a bellows-shaped diaphragm 56. The other end of the bellows-shaped diaphragm is tied to a cylindrical wall 57 at the outer end of a cylindrical ring 58 having its inner end 59 projection-welded to the center partition 47. Intermediate the ends 57 and 59 of the ring 58 is a channel 60 soldered to the ring 58, to the center partition 47 and to the underside of the bottom wall 22 of the gas distributing chamber and connecting the valve port 23 to the interior of the measuring chamber defined by the bellows diaphragm 56. The other valve port 24 leads directly through the bottom wall 22 of the measuring chamber to the space between the outside of the bellows diaphragm 56 and the inside of the lower case thereby forming the other gas measuring chamber on one side of the partition 47. Although the description has been confined to the measuring chambers of one side of the partition 47, there is on the other side of the partition another pair of identical measuring chambers having the same construction.

From the foregoing, it will be apparent that all the operating parts of the meter are mounted in the pan-shaped stamping forming the gas distributing chamber and on the center partition 47 depending from the bottom wall of the pan. After the operating parts of the meter have been assembled, the assembly of the meter is completed by first assembling the two halves 39, 40 of the lower case and seam welding the flanges 43 to the center partition 47 and soldering the seam 46 into which the lower end 45 of the gas distributing chamber telescopes. When the lower case assembly is complete, calibrating adjustments can be made to the tangent 34 in the usual manner and the assembly of the meter completed by seam welding the cover 3 to the outwardly extending flange 2 at the top of the gas distributing chamber. With this construction, the entire meter is permanently sealed free from tampering.

What is claimed as new is:

1. A gas meter casing comprising an upper gas distributing chamber and lower measuring chambers, said gas distributing chamber comprising a one-piece open-topped pan with a bottom and upwardly extending side walls for mounting valves and registering mechanism, and a cover for the open-topped pan, said gas measuring chambers comprising a center partition depending from and sealed to the bottom wall of the pan for mounting measuring diaphragms, and an open-topped lower case consisting of two halves respectively on opposite sides of the center partition and each having outwardly extending peripheral flanges abutting and secured to the center partition which is sandwiched between the flanges, the lower end of the open-topped pan of the gas distributing chamber being telescoped within and sealed to the open top of the lower case.

2. A gas meter casing comprising an upper gas distributing chamber and lower measuring chambers, said gas distributing chamber comprising a one-piece open-topped pan with a bottom and upwardly extending side walls for mounting valves and registering mechanism, and a cover for the open-topped pan, said gas measuring chambers comprising a center partition depending from and sealed to the bottom wall of the pan for mounting measuring diaphragms, an open-topped lower case consisting of two halves respectively on opposite sides of the center partition and each having outwardly extending peripheral flanges abutting the center partition which is sandwiched between the flanges, the lower end of the open-topped pan of the gas distributing chamber being telescoped within the open top of the lower case, and solder joining the flanges and center partition and the telescoped lower end of the one-piece pan and the open-topped case.

References Cited in the file of this patent
FOREIGN PATENTS

| | | |
|---|---|---|
| 562,096 | Great Britain | June 19, 1944 |
| 577,442 | Great Britain | May 17, 1946 |
| 604,855 | Great Britain | July 12, 1948 |